United States Patent
Mannheim Astete et al.

(10) Patent No.: US 11,691,907 B2
(45) Date of Patent: Jul. 4, 2023

(54) METHOD OF BENDING DISSIMILAR GLASS COMPOSITIONS

(71) Applicant: AGP America S.A., Ciudad de Panama (PA)

(72) Inventors: Mario Arturo Mannheim Astete, Lima (PE); Iván Arturo Cornejo, Lima (PE); Jean Marie Le Ny, Lima (PE)

(73) Assignee: AGP America S.A.

( * ) Notice: Subject to any disclaimer, the term of this patent is extended or adjusted under 35 U.S.C. 154(b) by 0 days.

(21) Appl. No.: 17/256,549

(22) PCT Filed: Jun. 28, 2019

(86) PCT No.: PCT/IB2019/055534
§ 371 (c)(1),
(2) Date: Dec. 28, 2020

(87) PCT Pub. No.: WO2020/003250
PCT Pub. Date: Jan. 2, 2020

(65) Prior Publication Data
US 2021/0253466 A1   Aug. 19, 2021

Related U.S. Application Data

(60) Provisional application No. 62/692,141, filed on Jun. 29, 2018.

(51) Int. Cl.
*C03B 23/023* (2006.01)
*B32B 17/10* (2006.01)
(Continued)

(52) U.S. Cl.
CPC ........ *C03B 23/023* (2013.01); *C03B 27/0426* (2013.01); *C03B 27/0528* (2013.01);
(Continued)

(58) Field of Classification Search
CPC ..... Y10T 428/42942; Y10T 428/24942; B32B 7/00; B32B 7/02; B32B 7/027;
(Continued)

(56) References Cited

U.S. PATENT DOCUMENTS

2015/0202854 A1* 7/2015 Tsuchiya .................. B32B 1/00
428/179

* cited by examiner

*Primary Examiner* — Maria V Ewald
*Assistant Examiner* — Ethan A. Utt
(74) *Attorney, Agent, or Firm* — The Morales Law Firm; Joseph L. Morales

(57) ABSTRACT

Glass laminates, comprising more than one glass composition, are becoming increasingly common as the industry moves towards lighter and stronger glazing. Bending dissimilar glass compositions can present problems. A mismatch in the glass viscosity curves, especially in the viscoelastic region of the compositions can result in one layer becoming softer than one of the other layers during the thermal bending process. As a result, economical processes, such as gravity or press bending in which multiple glass layers are simultaneously bent, may not be practical to use forcing the use of more expensive single glass layer bending processes. By thermal treatment processes the fictive temperature of at least one of the glass compositions prior to bending can be shifted to better match the other compositions allowing the glass layers to be simultaneously bent.

15 Claims, 2 Drawing Sheets

(51) Int. Cl.
    *B32B 17/06*          (2006.01)
    *C03B 27/04*         (2006.01)
    *C03B 27/052*      (2006.01)

(52) U.S. Cl.
    CPC ......... *B32B 17/06* (2013.01); *B32B 17/10036* (2013.01); *B32B 17/10119* (2013.01); *B32B 17/10128* (2013.01)

(58) Field of Classification Search
    CPC .. B32B 7/04; B32B 7/12; B32B 17/00; B32B 17/06; B32B 17/10; B32B 17/10005; B32B 17/10009; B32B 17/10036; B32B 17/10082; B32B 17/10376; B32B 17/1055; B60J 1/00; B60J 1/001; B60J 1/02; B60J 1/08; B60J 1/18
    USPC ....... 428/426, 427, 428, 212; 296/77.1, 84.1
    See application file for complete search history.

METHOD OF BENDING DISSIMILAR GLASS COMPOSITIONS

FIELD OF THE INVENTION

The invention relates to the field of laminated glazing.

BACKGROUND OF THE INVENTION

Glass laminates, where the multiple glass layers are comprised of more than just one type of glass composition, are becoming increasingly common as the industry moves towards lighter and stronger glazing.

The types of glass that may be used in a laminate include but are not limited to: the common soda-lime variety typical of automotive glazing as well as aluminosilicate, lithium aluminosilicate, borosilicate, boroaluminosilicates, glass-ceramics, and the various other inorganic solid amorphous compositions which undergo a glass transition and are classified as glass including those that are not transparent. The glass layers may be comprised of heat absorbing glass compositions as well as infrared reflecting and other types of coatings.

Most of the glass used for containers, flat glass, and fibers is soda-lime glass. Soda-lime glass is made from sodium carbonate (soda), lime (calcium carbonate), silicon dioxide (silica), aluminum oxide (alumina), and small quantities of substances added to alter the color and other properties.

Borosilicate glass is a type of glass that contains boron oxide. It has a low coefficient of thermal expansion and a high resistance to corrosive chemical. It is commonly used to make light bulbs, laboratory glassware, and cooking utensils.

Aluminosilicate glass contains amounts of aluminum oxide greater than about 5% by weight. It is even more resistant to chemicals than borosilicate glass and it can withstand higher temperatures. Chemically tempered Aluminosilicate glass is widely used for displays on smartphones and other electronic devices.

The glass layers of a laminate may be annealed or strengthened. There are several processes that can be used to increase the strength of glass. The two processes are the most commonly used by the automobile glazing industry are thermal strengthening, in which the hot glass is rapidly cooled (quenched) and chemical tempering which achieves the same effect through an ion exchange chemical treatment.

Heat strengthened, full temper soda-lime float glass, with a compressive strength in the range of at least 70 MPa, can be used in all vehicle positions other than the windshield. Heat strengthened (tempered) glass has a layer of high compression on the outside surfaces of the glass, balanced by tension on the inside of the glass which is produced by the rapid cooling of the hot softened glass. When tempered glass breaks, the tension and compression forced are no longer in balance and the glass breaks into small beads with dull edges. Tempered glass is much stronger than annealed laminated glass. The thickness lower limit of the typical automotive heat strengthening process is in the 3.1 mm to 3.6 mm range. This is due to the rapid heat transfer that is required. It is not possible to achieve the high surface compression needed with thinner glass using the typical blower type low pressure air quenching systems.

In the chemical tempering process, larger ions outside the surface of the glass are exchanged with ions inside the glass that are smaller. This process places the outer layer of glass in compression. Compressive strengths of up to 1,000 MPa are possible with a depth of layer up to 100 μm. The typical method involves submerging the glass in a tank of molten salt where the ion exchange takes place. The glass surface must not have any paint or coatings that will interfere with the ion exchange process.

One of the key elements of the strategy to improve the energy efficiency of vehicles has been the concept of light weight. Often, more traditional, less expensive, conventional materials and processes are being replaced by innovative new materials and processes which while sometime being more expensive, still have higher utility than the materials and processes being replaced due to their lower weight and the corresponding increase in fuel efficiency.

By reducing the weight of the vehicle significant improvements can be made in energy consumption. This is especially important for electric vehicles where the improvement directly translates into an increase in the mileage range of the vehicle which is a key consumer concern.

A substantial reduction in weight can be achieved by laminating a standard soda-lime glass outer glass layers with a thin chemically tempered inner glass layer. An aluminum-silicate composition is typically used as the inner glass layer. Other glass composition may be used to increase the toughness and resistance to breakage of a laminate.

There are various processes used to bend the glass layers comprising a laminate. Gravity bending is a process in which the glass is heated to its viscoelastic viscosity region at which the hot soft glass is allowed to sag under the influence of gravity, to its final shape. The typical process uses a female mold that supports the glass near its periphery. The outer glass layer is placed on the mold first with the inner glass layer stack on top of it. The advantage to this process is that no contact is made with the surface of the glass during heating and forming which lessens the probability of optical defects occurring. The main drawback is that dimensional control isn't as precise as with some other bending methods. The two of more flat glass layers are both stacked onto the same mold and bent as a pair. This guarantees a good match between the two surfaces which is a requirement for good optics and durability.

Gravity bending was used almost exclusively for many years to bend mass series production windshield due to the low cost of the initial tooling and high throughput of the process.

In response to the industry needs for better surface curvature control, the industry has been moving toward full and partial surface pressed laminates. In some processes, a full or partial surface press is used in conjunction with the gravity bending process. The glass is at least partially bent using a traditional gravity bending process and then, in the final stage, the press is used to give the glass it's final shape. Often air pressure and vacuum are used to aid compliance to the shape of the press. This process has the advantage in that it can be adapted to an existing gravity bending process and to existing gravity bending tooling. The layers of the laminate are bent in sets simultaneously.

For even better surface control, single layer pressing may be used. This process is very similar to the process used to produce tempered parts. The inner and outer glass layers are bent separately. Each glass ply runs through a furnace on roller and is then mated with a full surface press. The glass is transferred from the press to a quenching system where the glass plies suffer rapidly and controlled cooling. Due to the thickness of automotive laminate glass, the glass is strengthened but does not achieve a full or high level of temper.

The main drawback to this process is that the throughput is lower than a comparable gravity bending line as the glass layers must be separately bent versus the simultaneous bending of each set with gravity bending.

As the multiple glass layers are bent as a set, if they are comprised of dissimilar compositions, it can present bending problems. A mismatch in the glass transition temperatures ($T_g$) of the compositions can result in one of the layers becoming softer than one of the other layers. As a result, it may not be possible to use the gravity bending processes, in which multiple glass layers are simultaneously bent.

To overcome these limitations, the typical approach has been to bend the differently compositions separately, which increases the cost and reduces the throughput of the process. When the lower $T_g$ is the outer glass layer, one solution is to swap the stacking order of the two layers reversing them during the gravity bending process and then swapping them back during assembly of the laminate. This can result in surface mismatch, delamination and optical defects.

It would be desirable to find a method that would allow dissimilar glass compositions to be bent using well-known bending processes.

BRIEF SUMMARY OF THE INVENTION

While float glass is generally annealed to a very low residual stress level, this also produced a glass with lower fictive temperature than a glass produced by some alternate methods. The reference temperatures, such as strain point, annealing point, softening point, etc., can be shifted by a thermal treatment with controlled heating and cooling curves (known as fictivation thermal process). Prior to the bending process, the glass is thermally treated to shift its fictive temperature up or down, to become closer that the fictive temperature of the other glass. Thus, re-engineering its viscosity curves allows to bend these glass compositions together what would otherwise be incompatible for use with a bending process wherein two or more glass layers are bent together at the same time.

REFERENCE NUMERALS OF DRAWINGS

Figure 1A:
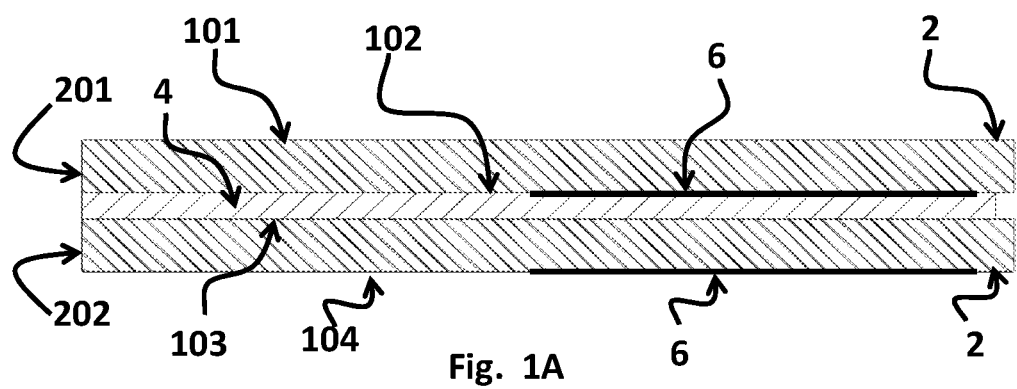
FIG. 1A shows a cross section: typical laminated glazing.

2 Glass
4 Plastic Interlayer
6 Obscuration
12 Film
18 Coating
101 Surface one
102 Surface two
103 Surface three
104 Surface four
201 Outer glass layer
202 Inner glass layer

DETAILED DESCRIPTION OF THE INVENTION

The term "glass" can be applied to many organic and inorganic materials, including many that are not transparent. For this document we will only be referring to nonorganic transparent glass.

From a scientific standpoint, glass is defined as a solid material comprising a non-crystalline amorphous structure that lacks the ordered molecular structure of polycrystalline and crystalline materials and possess a glass transition region. Glasses have the mechanical rigidity of crystals with the random structure of liquids.

Glass is formed by mixing various substances together and then heating to a temperature where they melt and fully dissolve in each other, forming a viscous homogeneous liquid.

When heated or cooled sufficiently glass undergoes a glass transition. While most materials go through the phase change, the change in state is abrupt and occurs as a precise temperature as the molecules go from moving about freely to being locked in place and vice versa. This is because of all the bonds between the molecules are identical and break at the same temperature.

In a glass, due to the random order of the molecules, the bonds are all different. The bond strength is a function of the stress on the bonds and temperature. In a glass, as the material is heated, it reaches a point where the bonds just begin to break, and the glass starts to soften. As the temperature is increased, more of the bonds continue to break and the glass becomes softer until the glass reaches its melting point where is it considered a liquid. This range of temperatures where the glass transitions from a liquid to a solid is known as the glass transition range. The center of this glass transition range is the glass fictive temperature, $T_f$. It can also be described as the temperature at which the enthalpy curves of the solid and the "liquid" glass crossover.

The glass transition region is primarily a function of the composition of the glass but is also a function of the temperature profile experienced during cooling from the liquid state to the solid state. This is because the rate of cooling influences the ordering of the molecules in the solid and the residual stress on the bonds. Each cooling treatment generates a new glass enthalpy vs. temperature curve and therefore the glass assumes a different volume and consequently a different density.

Glass if rapidly cooled will tend to have higher residual stress, higher volumes, and higher fictive temperatures than glass that has been slowly cooled. Therefore, the fictive temperature of glass characterizes the glass structure and its thermal history.

We can re-fictivate the glass by heating the it to its glass transition range, holding at that temperature for some period of time and then slowly/or rapidly cooling the glass back down to below the glass transition range.

We can take advantage of this phenomena to shift the bending viscosities up or down, to allow for curving simultaneously dissimilar glass compositions made by dissimilar processes.

Most of the worlds' flat glass is produced by the float glass process, first commercialized in the 1950s. In the float glass process, the raw ingredients are melted in a large refractory vessel and then the molten glass is extruded from the vessel onto a bath of molten tin where the glass floats. The thickness of the glass is controlled by the speed at which the molten glass is drawn from the vessel. As the glass cools and hardens, the glass ribbon transfers to rollers. Float glass thickness can typically vary by +/50 µm over a short distance due to what is known as draw line distortion. This is caused by the mechanical means used to draw the molten glass extruded from the vessel into a thin ribbon on the flat glass float line.

We distinguish between the "air" side of the float glass and the "tin" side. A thin coating of tin remains on the glass which will fluoresce and thus can be detected with ultra-violet light.

The fusion or overflow downdraw method is another technique for producing flat glass. The method has the advantage in that the glass surfaces never come in contact with other materials such as the molten tin as in the float glass process, leaving a surface with significantly less defects and other impurities when compared to float glass.

The fusion method was originally developed in the 1960s as a low-cost method for manufacturing optically superior glass for automotive windshields but was replaced by the float glass method. Previously windshield had been made from plate glass which required grinding and polishing to improve the optical quality of the glass. The fusion technology was reintroduced to produce very thin glass for the flat screen display market. A sheet of glass is formed when molten glass overflows from a supply trough, flows down both sides, and rejoins (fuses) at the tapered bottom, where it is drawn away in sheet form. Glass produced by the fusion method tends to have higher residual stress than float glass, and much higher fictive temperatures than a similar glass composition formed via the float method.

The following terminology is used to describe the laminated glazing of the invention.

Figure 1B:
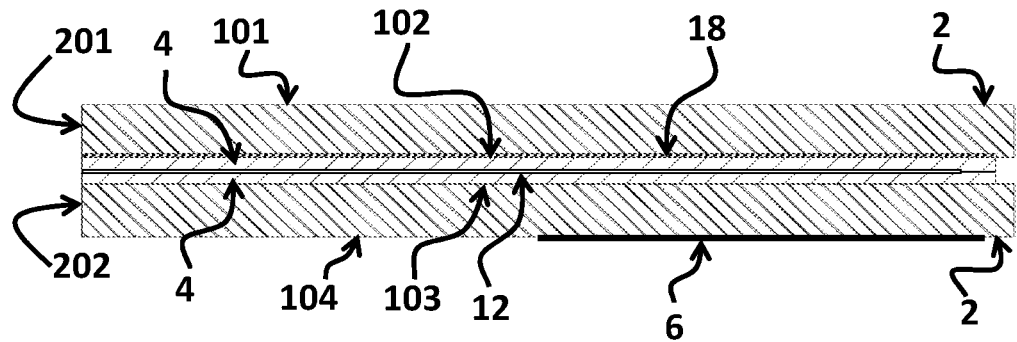
FIG. 1B shows a cross section: typical laminated glazing with coating and performance film.

Typical automotive laminated glazing cross sections are illustrated in FIGS. 1A and 1B. A laminate is comprised of two layers of glass, the exterior or outer, 201 and interior or inner, 202 that are permanently bonded together by a plastic layer 4 (interlayer). In a laminate, the glass surface that is on the exterior of the vehicle is referred to as surface one 101 or the number one surface. The opposite face of the exterior glass layer 201 is surface two 102 or the number two surface. The glass 2 surface that is on the interior of the vehicle is referred to as surface four 104 or the number four surface. The opposite face of the interior layer of glass 202 is surface three 103 or the number three surface. Surfaces two 102 and three 103 are bonded together by the plastic layer 4. An obscuration 6 may be also applied to the glass. Obscurations are commonly comprised of black enamel frit printed on either the number two 102 or number four surface 104 or on both. The laminate may have a coating 18 on one or more of the surfaces. The laminate may also comprise a film 12 laminated between at least two plastic layers 4.

Figure 2:
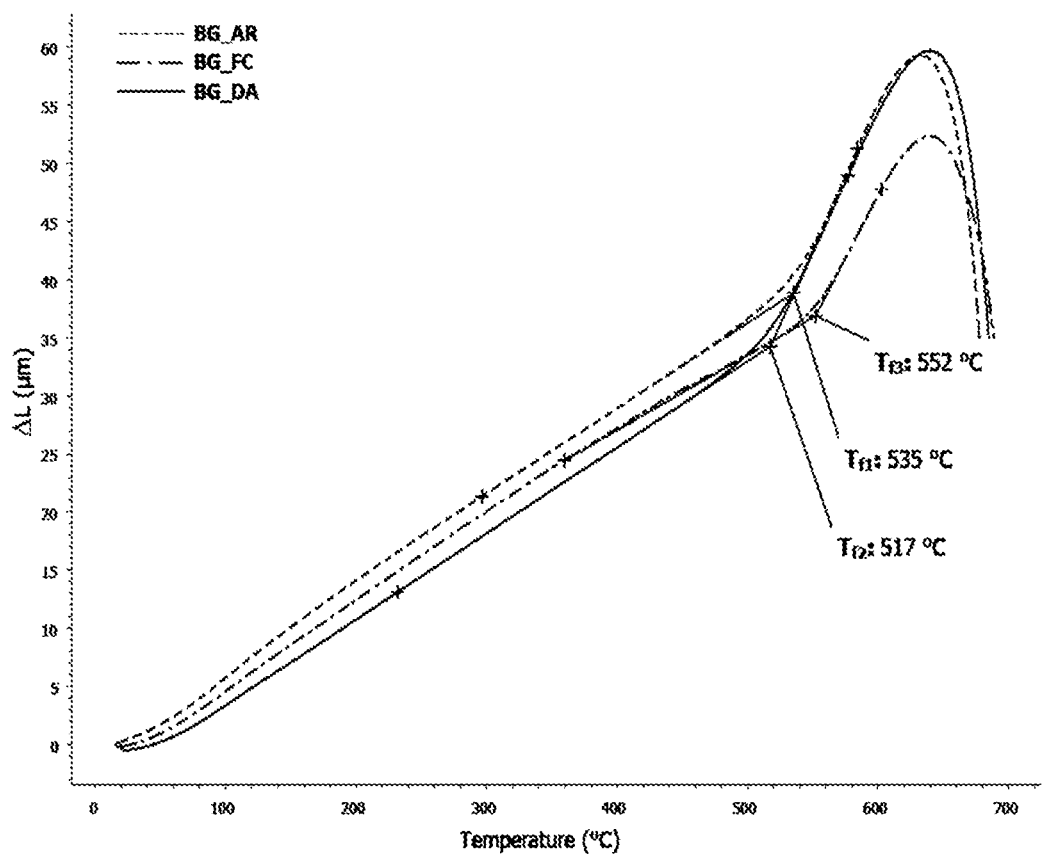
FIG. 2 shows dilatometry results on a glass indicating the change in fictive temperature due to a glass pre-bending heat treatment.

FIG. 2 is an example of adjustment of the viscous-elastic region of the viscosity curve of a glass composition by subjecting the glass to a heat treatment. This Figure shows dilatometry results obtained on a borosilicate glass composition comparing three glass conditions, as-received glass samples and samples that were heat treated at two different rates. The later samples were firstly cut to the standard dilatometry size and heated to slightly above their $T_g$ temperature (around 550° C.). They were subsequently cooled at slow and fast controlled rates of 1° C./min and 50° C./min, respectively down to room temperature. Two samples of each type of glass were measured in a dilatometer at a heating measuring rate of 10° C./min in static air. FIG. 2 curves show the dilatometry results obtained for each of the glass types where ΔL is the difference between the initial and measured sample length (μm) and the temperature (° C.) is the sample temperature. The as-received dilatometry curve (curve named BG_AR) indicates a measured $T_f$ of 535° C. The slow cooling samples, or dead annealed samples (curve named BG_DA) show a shift in fictive temperature to $T_f$ of 517° C. $T_f$ was obtained using a dilatometry software by measuring the intersection of the tangent curves on the lower and the upper portions of the measured sample curves. It was possible to lower the $T_f$ and consequently the $T_g$ of the samples by submitting the glass samples to a heating treatment. It is important to note here that $T_g$ and $T_f$ are very close temperatures. This results clearly demonstrate that it is possible to re-engineer the visco-elastic region of the viscosity curve of a glass to allow for dissimilar composition glass bending.

In several embodiments, the outer glass layer is a soda-lime glass or a borosilicate glass, and the inner glass layer is an aluminosilicate glass or soda-lime. In some embodiments, the fast cooling rate ranges from 20° C./min to 100° C./min, and the slow cooling rate ranges from 0.1° C./min to 20° C./min. In addition, in some embodiments, the outer glass layer is 2.1 mm or 2.3 mm thick, and the inner glass layer is 0.7 mm thick.

Example 1

In the Example 1, a laminated glazing is comprised of an outer glass layer and an inner glass layer. The fictive temperature ($T_f$) of the outer glass layer as received from the glass supplier is 570° C. and the inner glass layer as received from the glass supplier is 600° C. The $T_f$ of inner glass layer is shifted, prior to bending by heating the glass to a temperature over 600° C. and then cooling down at a slow cooling rate of 5° C./min. By doing so the $T_f$ may be shifted by up to 30° C. to about 570° C. The outer glass layer is not treated to shift its fictive temperature. This way, both glass compositions, outer and inner glass layers, may be bent together to its final shape. The gap between the mating surfaces of the first and second glass layers reaches no more than 2 mm, achieving a desirable surface match. The laminate may then be assembled and subjected to a lamination process.

Example 2

In the example 2, a laminated glazing is comprised of an outer glass layer and an inner glass layer. The fictive temperature ($T_f$) of the outer glass layer, as received from the glass supplier, is 570° C. and inner glass layer as received from the supplier is 600° C. The $T_f$ of outer glass layer is shifted prior to bending by heating the glass to a temperature over 570° C. and then cooling it down at a fast cooling rate of 50° C./min. By doing so the $T_f$ is shifted by up to 30° C. to about 600° C. The inner glass layer is not treated to shift its fictive temperature. Both glass layers, outer and inner, are bent together to its final shape. The gap between the mating surfaces of the first and second glass layers is about 1 mm. The laminate is assembled and subjected to a lamination process.

Example 3

In the example 3, a laminated glazing is comprised of an outer glass layer and an inner glass layer. The fictive temperature ($T_f$) of the outer glass layer, as received from the glass supplier, is 570° C. and inner glass layer as received from the supplier is 600° C.

The $T_f$ of outer glass layer is shifted, prior to bending by heating the glass to a temperature over 570° C. and then cooling down to a slow cooling rate of 15° C./min. By doing so the $T_f$ is shifted by up to 15° C. to about 585° C. The $T_f$ of the inner glass layer is shifted by heating the glass to a temperature over 600° C. and then cooling down to a fast cooling rate of 30° C./min. By doing so the $T_f$ is shifted by up 15° C. to about 585° C.

Both glass, outer and inner glass layers, are bent together to its final shape. The laminate is assembled and subjected to a lamination process.

The forms of the invention shown and described in this specification represent illustrative preferred embodiments and it is understood that various changes may be made without departing from the spirit of the invention as defined in the following claimed subject matter.

The invention claimed is:

1. A bent laminated glass, comprising:
   a first glass layer comprised of a first glass composition having a fictive temperature; and
   a second glass layer comprised of a second glass composition having a fictive temperature T2;
   wherein the first glass composition is different from the second glass composition; and
   the difference between the fictive temperature of the first glass layer and the fictive temperature T2 is no more than 30° C.

2. The bent laminated glass of claim 1, wherein in the second glass layer, the fictive temperature T2 is reached by shifting an original fictive temperature of the second glass composition to the fictive temperature T2.

3. The bent laminated glass of claim 2, wherein the fictive temperature of the first glass layer is greater than the fictive temperature T2, and the fictive temperature T2 is greater than an original fictive temperature of the second glass layer.

4. The bent laminated glass of claim 1, wherein the fictive temperature of the first glass layer is the fictive temperature T2.

5. The bent laminated glass of claim 1, wherein the difference between the fictive temperature of the first glass layer and the fictive temperature T2 is not more than 20° C.

6. The bent laminated glass of claim 1, wherein the fictive temperature of the first glass layer is greater than the fictive temperature T2.

7. The bent laminated glass of claim 1, wherein the fictive temperature T2 is greater than the fictive temperature of the first glass layer.

8. The bent laminated glass of claim 1, wherein the first glass layer is an aluminosilicate glass, and the second glass layer is a soda-lime glass.

9. The bent laminated glass of claim 1, wherein the first glass layer is an aluminosilicate glass or soda-lime, and the second glass layer is a borosilicate glass.

10. The bent laminated glass of claim 1, wherein there is no more than a 2 mm gap between the mating surfaces of the first and second glass layers.

11. A method for producing a bent laminated glass having a first glass layer comprised of a first glass composition and a second glass layer comprised of a second glass composition, the first glass composition being different from the second glass composition, the method comprising the steps of:
    treating the first glass layer by a thermal process, such that the fictive temperature of the first glass composition is shifted from T1 towards the fictive temperature T2, wherein the fictive temperature T2 is the fictive temperature of the second glass composition and the difference between the shifted fictive temperature of the first glass layer and the fictive temperature T2 is no more than 30° C.;
    bending said at least two glass layers simultaneously by a bending process; and
    cooling said at least two glass layers.

12. The method for producing a bent laminated glass of claim 11, further comprising the step of: treating the second glass layer with a thermal process, such that the fictive temperature T2 is reached by shifting its fictive temperature from T3 to T2.

13. The method for producing a bent laminated glass of claim 11, wherein the step of treating the first glass layer by a thermal process comprises the steps of: heating the first glass layer to a temperature over the fictive temperature T2; and cooling the first glass layer at a cooling rate selected from the group consisting of a fast cooling rate and a slow cooling rate.

14. The method for producing a bent laminated glass of claim 13, wherein the fast cooling rate ranges from 20° C./min to 100° C./min.

15. The method for producing a bent laminated glass of claim 13, wherein the slow cooling rate ranges from 0.1° C./min to 20° C./min.

* * * * *